United States Patent [19]

Bone et al.

[11] Patent Number: 5,140,448
[45] Date of Patent: Aug. 18, 1992

[54] APPARATUS FOR AND METHOD OF OPERATION OF SMECTIC LIQUID CRYSTAL LIGHT VALVE HAVING SCATTERING CENTERS

[75] Inventors: Matthew Bone, San Jose; David E. Slobodin, Saratoga; Duane A. Haven, Cupertino, all of Calif.; Michael Stefanov, Lynn Haven, Fla.; Frederic J. Kahn, Palo Alto, Calif.

[73] Assignee: Greyhawk Systems, Inc., Milpitas, Calif.

[21] Appl. No.: 602,505

[22] Filed: Oct. 24, 1990

[51] Int. Cl.⁵ .................. G02F 1/135; G02F 1/137
[52] U.S. Cl. .......................... 359/44; 359/72; 359/90; 359/100
[58] Field of Search ............ 350/342, 346.4 S; 359/724 S, 904 S, 100.4 S, 43, 44, 45

[56] References Cited

U.S. PATENT DOCUMENTS

| | | | |
|---|---|---|---|
| 3,732,429 | 5/1973 | Braunstein et al. | 359/72 X |
| 4,031,529 | 6/1977 | Bore et al. | 350/346 X |
| 4,106,853 | 8/1978 | Boswell | 350/346 X |
| 4,277,145 | 7/1981 | Hareng et al. | |
| 4,440,473 | 4/1984 | Sekimoto | |
| 4,477,151 | 10/1984 | Mash | |
| 4,941,735 | 7/1990 | Moddel et al. | 350/342 |

FOREIGN PATENT DOCUMENTS 2360145 2/1978 France .
64-61728 3/1989 Japan .

Primary Examiner—Stanley D. Miller
Assistant Examiner—Ron Trice
Attorney, Agent, or Firm—Flehr, Hohbach, Test, Albritton & Herbert

[57] ABSTRACT

A liquid crystal light valve, comprising a layer of liquid crystal for storing image information and a photoconductor aligned with the liquid crystal and positioned in closed proximity thereto for effecting an electric field applied across the liquid crystal. Apparatus is provided for simultaneously applying an electric field across the liquid crystal and photoconductor while impinging optical image information on the photoconductor, the photoconductor and applied field combining to produce a modified electric field across the liquid crystal which impresses the image information on the photoconductor into the liquid crystal.

16 Claims, 6 Drawing Sheets

LIQUID CRYSTAL LIGHT VALVE

LIQUID CRYSTAL LIGHT VALVE

EQUIVALENT CIRCUIT
OF LIQUID CRYSTAL CELL

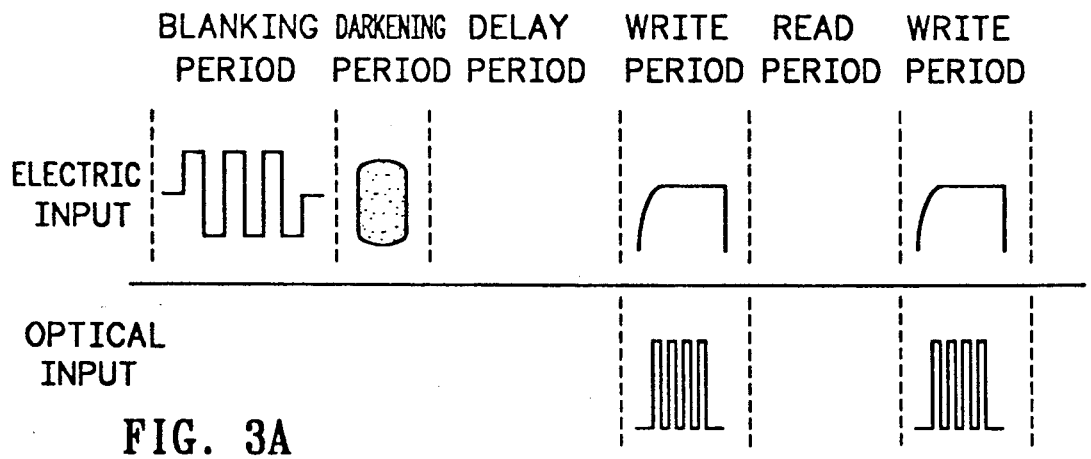
FIG. 3A
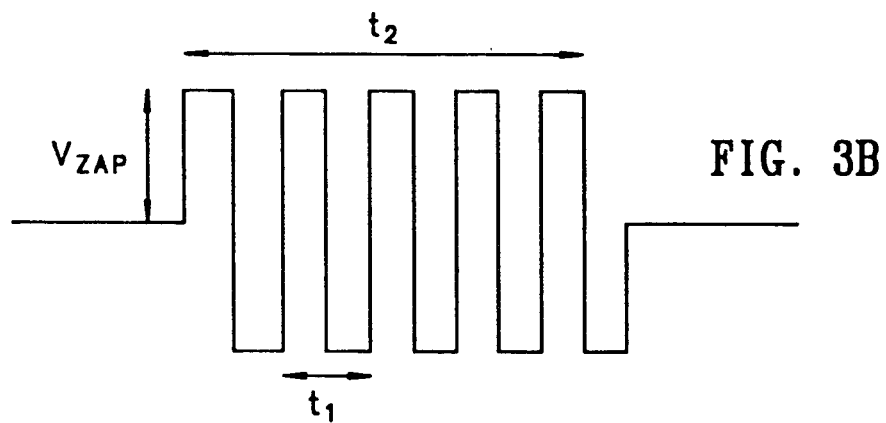
FIG. 3B
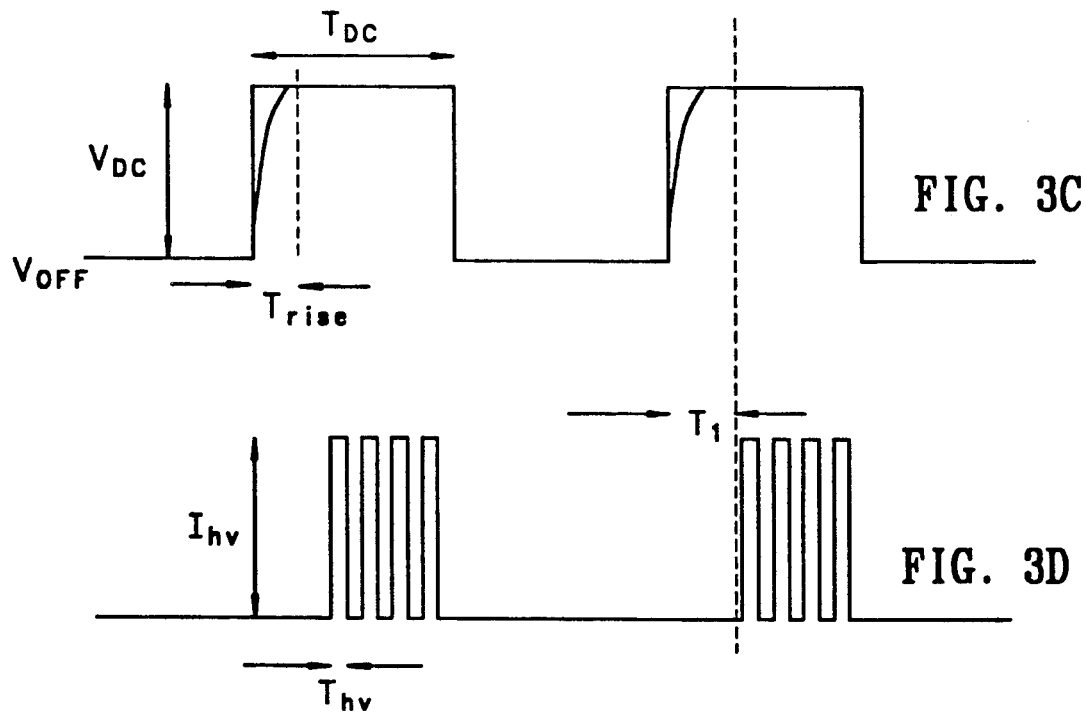
FIG. 3C
FIG. 3D 7-6i,L=700nm,1-26-90

1khz,50ms 7-6i,T=41,L=700nm

V=100@50msec,1-24-90

SERIAL SCANNING
APPARATUS

APPARATUS FOR AND METHOD OF OPERATION OF SMECTIC LIQUID CRYSTAL LIGHT VALVE HAVING SCATTERING CENTERS

BACKGROUND OF THE INVENTION

1. Field of Invention

The present invention relates to liquid crystal light valve image projection systems. More specifically, the present invention relates to applying a spatially varying electric field across a liquid crystal cell to produce a transparent image having a spatially varying optical density.

2. Summary of Prior Art

Liquid crystal cells are useful in display, optical processing, printing, photolithographic, and related image projection applications. In these applications they serve as light valves or light modulators which control the transmission or reflection of light from a light source to a receiver or receiving surface. When suitable spatial electronic addressing means is incorporated in a liquid crystal light valve system, spatially varying patterns can be written on the liquid crystal cell. The liquid crystal cell then becomes a spatial light modulator. When suitable illumination optics, typically including a light source and optical condenser, and suitable projecting optics, typically including projection lens with appropriate aperture, are included in a liquid crystal light valve system, the liquid crystal cell then becomes an electronic slide which determines and controls a projected image.

The spatial variations of the image on the liquid crystal cell correspond to differences in the molecular orientation of the liquid crystal in different regions of the liquid crystal layer. The spatially varying differences in molecular orientation are converted into spatially varying light intensity variations by means of suitable polarizing optics or suitable apertures to selectively pass and block scattered or refracted light from these spatially different regions. Various possibilities have been reviewed in detail in the literature (see Kahn, "The Molecular Physics of Liquid Crystal Devices", Physics Today, May 1982.)

In many liquid crystal devices, the entire image area of the liquid crystal cell is switched, typically by electrical or thermal means, into a texture with uniform order (or disorder), thereby providing a uniform image background. One or more spatially varying images with different textures are then superposed, by a spatial addressing means, onto the uniform image background in order to create an image on the liquid crystal cell, and hence on a receiving surface, with the desired spatial variations in intensity and contrast.

The means for creating the spatial variations of texture in the liquid crystal fall into two general categories; that in which the variations are the result of phase changes in the material (see Kahn), and those in which changes in optical retardation of polarized light occurs due to changes in the orientation of the molecular axis of the liquid crystal. These changes typically are caused by local application of electric field (see Boller et al., "A Low Electro-optic Threshold in New Liquid Crystals", J. Applied Physics, Vol. 43, May 1971).

Devices which use optical retardation effects to modulate light are typically non-storage and need to be refreshed at or near the flicker-frequency threshold of the human eye, about 17ms/frame. While these devices have frame writing times on the order of several milliseconds, they are not capable of image storage. Consequently, high information content images require high bandwidth addressing and large capacity digital memories. Prior art devices utilized liquid crystal devices (typically with nematic liquid crystals) in which a frame of information in optical form is impressed on the photoconductor which then transiently modulates the liquid crystal and must be refreshed at approximately 60 times/sec.

Additionally, in these photo-conductive addressed devices, the addressing light and the interrogation light are applied at the same time. Therefore, a light blocking layer is typically disposed between the photoconductor and the liquid crystal layer to avoid activating the photoconductor by the action of the interrogation light.

Devices which use phase change effects to modulate light are typically storage-type and only need to be addressed once. A smectic or cholesteric liquid crystal has two stable states, or mesophases. In one state the liquid crystal is transparent and in the other it is scattering. Those regions on the microscopic scale where the liquid crystal is in the scattering state are called scattering centers. Thermal methods are primarily used to induce phase changes. In general, the liquid crystal material is heated above the nematic-isotropic transition temperature and then allowed to cool. If slowly cooled, a transparent state results, if quickly cooled, a scattering state results. Local thermal phase changes are, for example, induced by laser scanning, and are relatively slow, with frame writing times in the order of several minutes for high resolution images. However, the image is stored in the liquid crystal until erased.

Most prior art optical projection systems which utilize a spatial variation in mesophase to modulate light create scattering images on clear backgrounds. When these scattering images are projected from the liquid crystal cell with suitable optics, they generally create images which are dark on a bright background. It is often desirable to create a bright image on a dark background. The optical system used to transform a scattering image on a clear background to a bright image on a dark background sacrifices brightness to achieve this objective.

An additional drawback to prior art systems which use scattering cells is that the ability to create greyscale, a continuous tone from black to white, is unavailable. Most prior art scattering systems are binary. That is, each point is either entirely in a scattering state or a clear state, and thus appears either full dark or full bright when projected.

OBJECTS OF THE INVENTION

Accordingly, it is an object of this invention to provide for the fast, real-time capture and storage in a liquid crystal cell of information from optical or electronically generated images.

It is another object of the present invention to provide a non-volatile clear image with greyscale on a uniform scattering background in a liquid crystal cell.

It is another object of the invention to provide a liquid crystal cell requiring no light-blocking layer.

It is another object of the invention to provide an improved process for creating a spatially varying image on a liquid crystal cell.

It is another object of the present invention to provide a liquid crystal cell which can accommodate additional images, which constitute less than the whole of the liquid crystal cell image capability regardless of time considerations.

It is yet another object of the present invention to provide methods of synchronizing optical and electrical addressing to optimize light valve performance.

SUMMARY OF THE INVENTION

The attainment of these and related objects may be achieved through use of the novel means of operating a spatially light modulator herein disclosed. A spatially light modulator in accordance with this invention produces a spatially varying clear state in the uniform scattering liquid crystal material. The spatially varying clear state is produced by (1) applying a thermal pulse to the liquid crystal material so that the temperature thereof is raised above the nematic-isotropic transition, (2) allowing the liquid crystal material to undergo rapid cooling at the end of the thermal pulse to a temperature below the nematic-isotropic transition to produce a spatially uniform density of scattering centers in the liquid crystal material, (3) after an indefinite period of this cooling, applying a spatially uniform electric field across both a photoconductor layer and the liquid crystal layer, and (4) simultaneously photoaddressing the photoconductor layer to produce a spatially varying electric field across the liquid crystal layer to create a spatially varying clearing of the scattering centers in the liquid crystal material.

The attainment of the foregoing and related objects, advantages and features of the invention should be more readily apparent to those skilled in the art, after review of the following more detailed description of the invention, taken together with the drawings.

BRIEF DESCRIPTION OF THE DRAWINGS

FIG. 3A is an illustrative diagram of the preferred method of operation of the liquid crystal cell.

FIG. 3B is an illustrative diagram of an electronic pulse applied to one resistive electrode that places the liquid crystal cell in the scattering state.

FIG. 3C is an illustrative diagram of an electronic pulse applied to facilitate full or intermediate clearing of scattering centers in the liquid crystal material.

FIG. 3D is an illustrative diagram of an optical pulse applied to the photoconductor layer to facilitate clearing of scattering centers in the liquid crystal material.

DETAILED DESCRIPTION OF THE INVENTION

Figure 1:
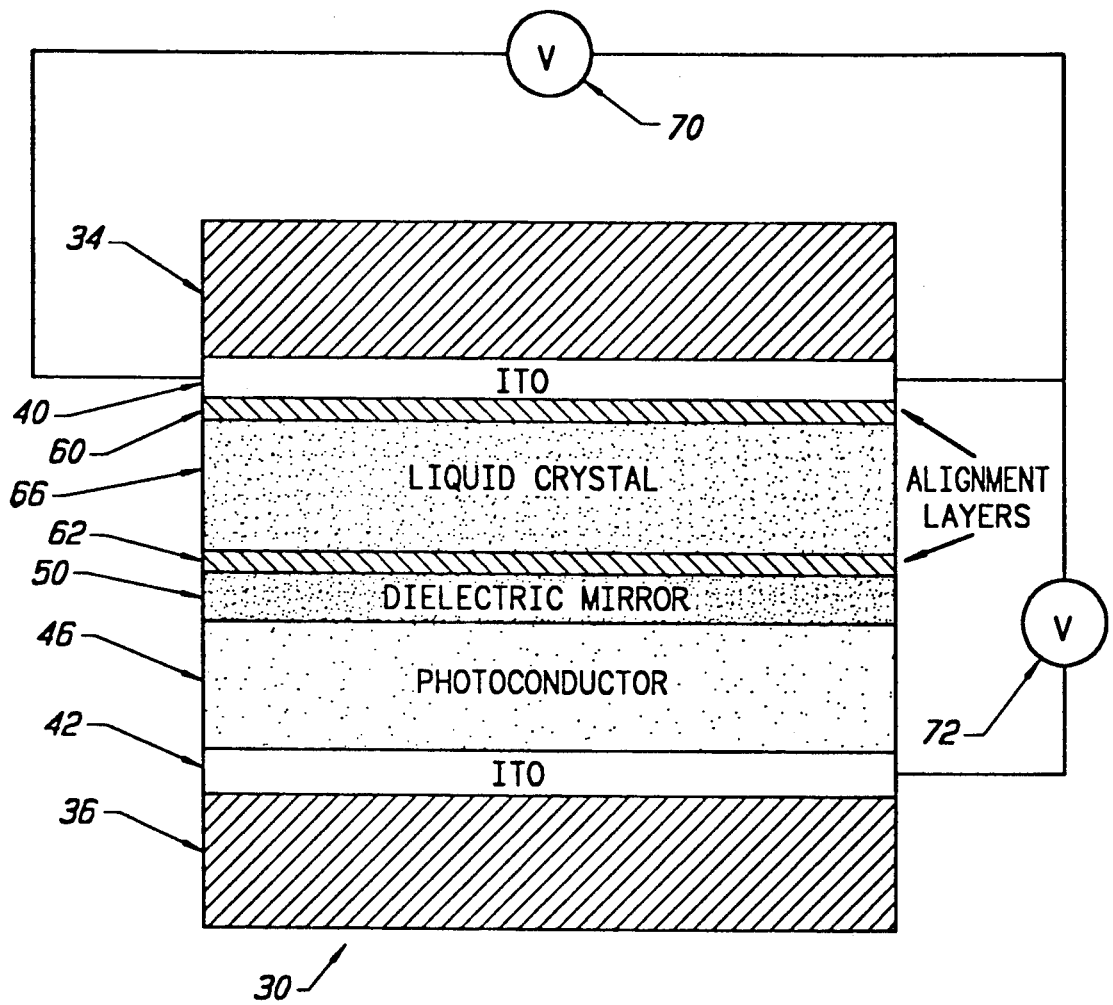
FIG. 1 is a cross-sectional illustration of the spatially varying liquid crystal cell of the preferred embodiment.

Referring to FIG. 1, a cross-sectional illustration of the liquid crystal cell is shown. The cell 30 is comprised of several components. The exterior of the cell 30 is formed by transparent panes of glass 34 and 36. Deposited on the panes of glass 34 and 36 are a pair of electrodes 40 and 42. The electrodes 40 and 42 are transparent conductors composed of indium tin-oxide (ITO) with sheet resistance in the range of 4 ohm/square to 20 ohms/square (nominally 6 ohms/square) for electrode 40, and sheet resistance in the range of 4 to 100 ohms/square for electrode 42.

Disposed adjacent to transparent electrode 42 is photoconductive layer 46. Photoconductive layer 46 is preferably composed of hydrogenated amorphous silicon (a-Si:H) and is disposed in a layer 2 to 10 microns thick. Disposed adjacent to photoconductive layer 46 is dielectric mirror 50. Dielectric mirror 50 is an efficient reflector of light energy. Dielectric mirror 50 is formed by multilayer alternating depositions of materials of high and low refractive index. Dielectric mirror 50 should preferably have a sheet resistivity greater than $10^{10}$ ohms/square to achieve maximum resolution in the spatial light modulator. The structure and fabrication of dielectric mirrors is well known in the art. Optionally, disposed between photoconductive layer 46 and dielectric mirror 50 may be a light blocking layer (not shown). The optional light blocking layer is an efficient absorber of light energy, but is electrically resistive. If a light blocking layer is used, it is preferably composed of according to the teachings of commonly assigned U.S. patent application Ser. No. 436,400 by David Slobodin. In the preferred mode of operation, the light blocking layer is not necessary.

Adjacent to the transparent electrodes 40 and to dielectric mirror 50 are alignment layers 60 and 62 which facilitate alignment of liquid crystal material. Suitable liquid crystal material 66 is disposed between alignment layers 60 and 62. Suitable liquid crystal is of smectic A type. A light scattering image may be formed by thermally or electrically induced phase changes in Smectic A liquid crystal. The alignment layers 60, 62 are constructed so as to cause the liquid crystal molecules immediately adjacent to the alignment layers to orient to the substrates 60, 62 is such orientation as to assist the formation of scattering centers. Organic and inorganic alignment agents may provide the desired alignment. In the constructed device, alignment layers 60, 62 consist of SiO evaporated at 5 degrees to the substrate.

Connected to the liquid crystal cell 30 are zap generator 70, and addressing pulse generator 72. Zap generator 70 is a power supply which applies a voltage through resistive electrode 40. Addressing pulse generator 72 is a power supply which applies a field across liquid crystal cell 30 by applying a voltage to electrodes 40 and 42.

Figure 2:
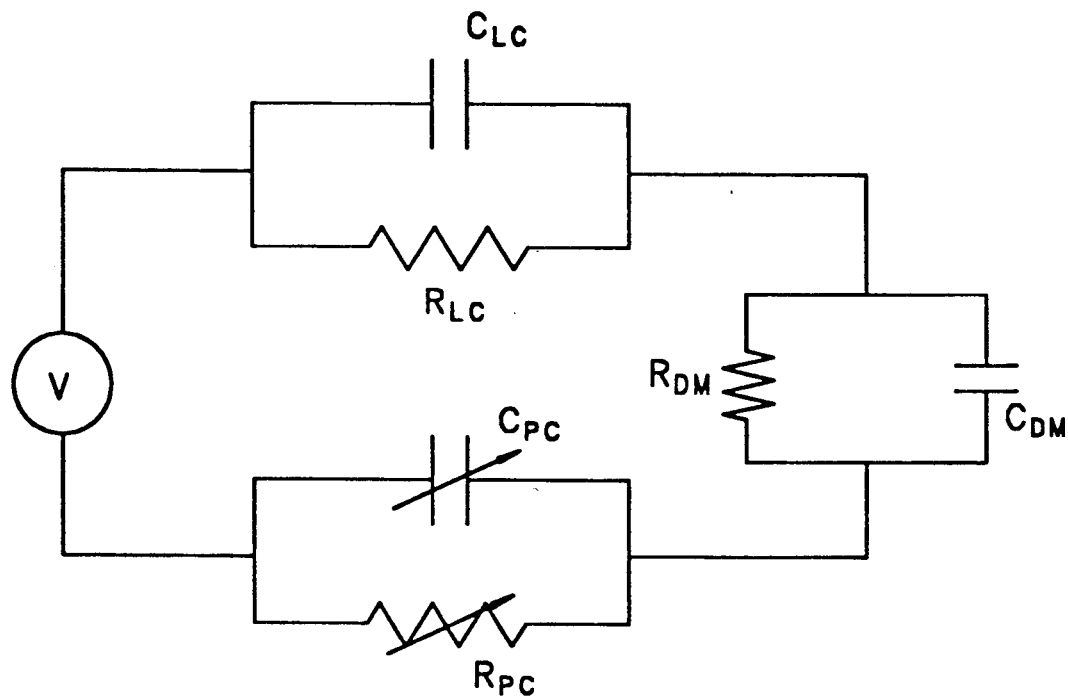
FIG. 2 is an schematic operating model for the first approximation equivalent circuit of the liquid crystal cell.

Referring to FIG. 2, a schematic diagram of the first approximation equivalent circuit of the liquid crystal cell 30 is shown. The cell 30 may be modeled as a capacitive/resistive voltage divider in which a drive voltage waveform (typically DC to several kHz) applied across the impedances variously defined by the photoconductor, dielectric mirror, optional light blocking layer, and liquid crystal in proportion to their individual impedances. The photoconductor is a material whose capacitive and resistive properties vary as a function of the intensity of applied light. The liquid crystal material has the property of a dielectric anisotropy, that is, in the scattering state the material has a lower dielectric constant than in the clear state. Smectic A liquid crystal molecules reorient when the force due to the applied field overcomes the elastic restraining forces. There are specific dielectric constants associated with these states.

In the photoaddressed device described, the field applied across the entire cell 30 exceeds the switching threshold field for the liquid crystal layer. However, the magnitude of the field which actually appears across the liquid crystal layer is controlled via the photoconductor. In the case where no light is falling on the photoconductor, the impedance of the photoconductor is at a maximum, the voltage drop across the photoconductor is maximized and the voltage drop across the liquid crystal is at a minimum. In the case where maximum light is falling on the photoconductor, maximum voltage appears across the liquid crystal. Intermediate levels of write light produce intermediate levels of voltage across the liquid crystal cell. (See Fraas et al., J. Applied Physics, Vol. 47, No. 2, Feb. 1976.)

To capture and store information in an appropriate non-volatile form for optical interrogation it is necessary to provide means whereby the molecular structure of the liquid crystal undergoes a metastable change in configuration which corresponds to the intensity level of the light impressed on the photoconductor.

Referring to FIG. 3a, an illustrative diagram of the temporal operation of the liquid crystal cell is shown. As shown in FIG. 3a, the method of operation is to apply an electrical pulse during the blanking period, allow the cell to cool during a darkening period, wait a delay period, and then apply an addressing electrical pulse in conjunction with optical information during the write period. The last step can be repeated multiple times. Between the write periods, the cell can be read.

In the preferred embodiment, during the blanking period, an electrical pulse of short duration (referred to as a "Zap pulse") is applied across the resistive electrode 40 by Zap generator 70. This Zap pulse resistively heats the electrode 40, thereby heating the adjacent liquid crystal material 66. The duration and magnitude of the Zap pulse is sufficient to momentarily raise the temperature of the liquid crystal material through the nematic-isotropic transition temperature. This causes the liquid crystal material to erase scattering centers and form a uniform clear state. The required Zap pulse amplitude will depend upon the liquid crystal material and the cell configuration. For the purposes of illustration only, a typical applied Zap pulse is shown in FIG. 3B. Referring to FIG. 3B, a Zap pulse that provides satisfactory results for a cell size of approximately 2 inches by 1.5 inches was found to have a duration $t_2$ between 0.5 and 50 ms, a voltage $V_{zap}$ of up to 300 V, and a frequency $1/t_1$ between 1 kHz and 10 kHz.

In an alternate embodiment, a heat inducing optical pulse of short duration is applied directly to the liquid crystal material 66 by an infrared pulse generator (not shown). The duration and intensity of this optical pulse is sufficient to raise the temperature of the liquid crystal above the transition temperature. To facilitate absorption of optical energy, a dye is often added to the liquid crystal material 66.

Following the blanking period, there is a darkening period in which the liquid crystal cools and assumes a uniform scattering texture. In the preferred mode of operation, the liquid crystal reaches thermal equilibrium, taking up to about 1 second. The darkening period is proportional to the strength of the blanking pulse. During the darkening period the liquid crystal temperature drops below the nematic-isotropic transition and assumes a uniform density of scattering centers. This quenching effect produces a higher density of scattering centers than effects such as dynamic scattering.

Following the darkening period is a delay period. The delay period is an indefinite wait. The general purpose of the delay period is to reduce thermal fluctuations as the liquid crystal continues to cool. Because the response of the liquid crystal to the optical and addressing pulse is temperature dependant, waiting for thermal equilibrium eliminates the need for temperature dependant addressing. In an alternate mode, if a cell temperature sensor coupled to data processing means is provided, and the parameters of the addressing pulse can be altered to take into account the time dependant cell temperature, the delay period can be zero, and the field is applied immediately after the temperature falls below the nematic-isotropic transition.

After the delay period there is a writing period during which optical and electrical pulses are applied to cell 30. An addressing pulse of previously determined magnitude is applied across electrodes 40, 42, by power supply 72. For the purposes of illustration only, a possible applied addressing pulse voltage is illustrated in FIG. 3C. The important variables of the addressing pulse are selected so as to cause complete switching if the photoconductor is fully illuminated, and no switching if the photoconductor is in the dark. The duration of the addressing pulse is sufficient to allow scanning of the cell either in parallel or in serial, as described below. Referring to FIG. 3C, the addressing pulse of the current device has a duration $T_{DC}$ between 25 ms and 250 ms. The magnitude of the addressing pulse voltage $V_{CD}$ is a function of the duration of the pulse, the frequency of the pulse, and the cell temperature. It has been found that in the current device, a DC voltage $V_{DC}$ between 50 V and 100 V produced satisfactory results, and that performance can be enhanced by use of an appropriate polarity. The addressing pulse is not applied for more than several hundred ms because extended application of this voltage across the cell can cause liquid crystal material degradation and extensive reorientation of the molecules over the whole area, thus reducing image quality. It is also possible to apply an AC addressing pulse of approximately 1 kHz to achieve similar results.

It has been demonstrated that the resolution and contrast of such a device may be enhanced by the application of a small DC voltage offset across the cell 30 during the addressing pulse. During typical operation, voltage generator 70 applies a voltage $V_{off}$ across electrode 40, 42. The required offset is dependent on the type of photoconductor used and the device configuration. Typical values for the offset voltage $V_{off}$ are in the range of +5 volts to −5 volts.

Synchronized with the addressing pulse, a light pattern is imaged onto the photoconductor layer 46 using write light of appropriate wavelength. (Appropriate write light may be in wavelength from visible to IR.) For the purposes of illustration only, a possible optical pulse, delivered by a pulse modulated laser for example, is shown in FIG. 3D. Referring to FIG. 3D, this imaging usually occurs some time $T_1$ after the addressing pulse is applied, where $T_1$ is larger than $T_{rise}$, the time for the voltage to rise across the liquid crystal material. At a particular pixel, the optical pulse will have some intensity $T_{hv}$ and duration $T_{hv}$. Suitable optical pattern sources include, but are not limited to a CRT, a transmissively or reflectively illuminated image, laser input from an optical computer, or an array of illuminating elements such as LEDs or TFELs. The write light impinging on the cell 30 causes the impedance of the photoconductor 46 to vary as a function of the intensity of the addressing light. Photoconductor layer 46 is chosen so as to be efficiently activated by the write light.

The liquid crystal has a positive dielectric anisotropy and will tend to align with the director parallel to an applied electric field. To induce such a reorientation the applied field must exceed some characteristic threshold level:

$$V^2_{th} + 2\ d(K_{11}B)^{\frac{1}{2}}/E_d E_O$$

where d is the cell spacing, $E_d$ is the dielectric anisotropy, $E_O$ is the permittivity of free space, B is the compression energy per unit volume, and $K_{11}$ is the splay elastic constant. This threshold $V_{th}$ is approximately 10 to 60 volts across a 5 micron thick film. Once this threshold is reached, the liquid crystalline material undergoes a metastable change from a scattering state to a clear state, which is permanent until thermally erased. The characteristic threshold level will vary with the type of liquid crystal used and also the operating temperature. As described above, the applied field is a function of the incident write light on the photoconductor layer. At high levels of illumination the field across the liquid crystal material exceeds the threshold for switching and a clear state is induced. With no illumination the liquid crystal material does not switch and remains in the scattering state. Intermediate levels of switching can be achieved by modulating the intensity of the write light, enabling the producing of greyscale.

There are a number of benefits to the mode of operation described by the present invention. Clear images can be produced on a scattering background without the use of slow cooling. The switching of the liquid crystal from a scattering state to a clear state, which takes milliseconds, is very fast compared to the prior techniques of thermal heating, which typically takes tens of seconds. A positive image can written on he liquid crystal cell when the device is photoaddressed; that is, in regions where the addressing light is bright, the image will be bright, and where the addressing light is absent, the image will be dark. A very high contrast ratio image can be created because the initial scattering state produced by quenching has a high density of scattering centers. The device can be photoaddressed when the liquid crystal is at thermal equilibrium or at room temperature, as opposed to during cooling or near the transition temperature, when the addressing period begins.

Figure 4A:
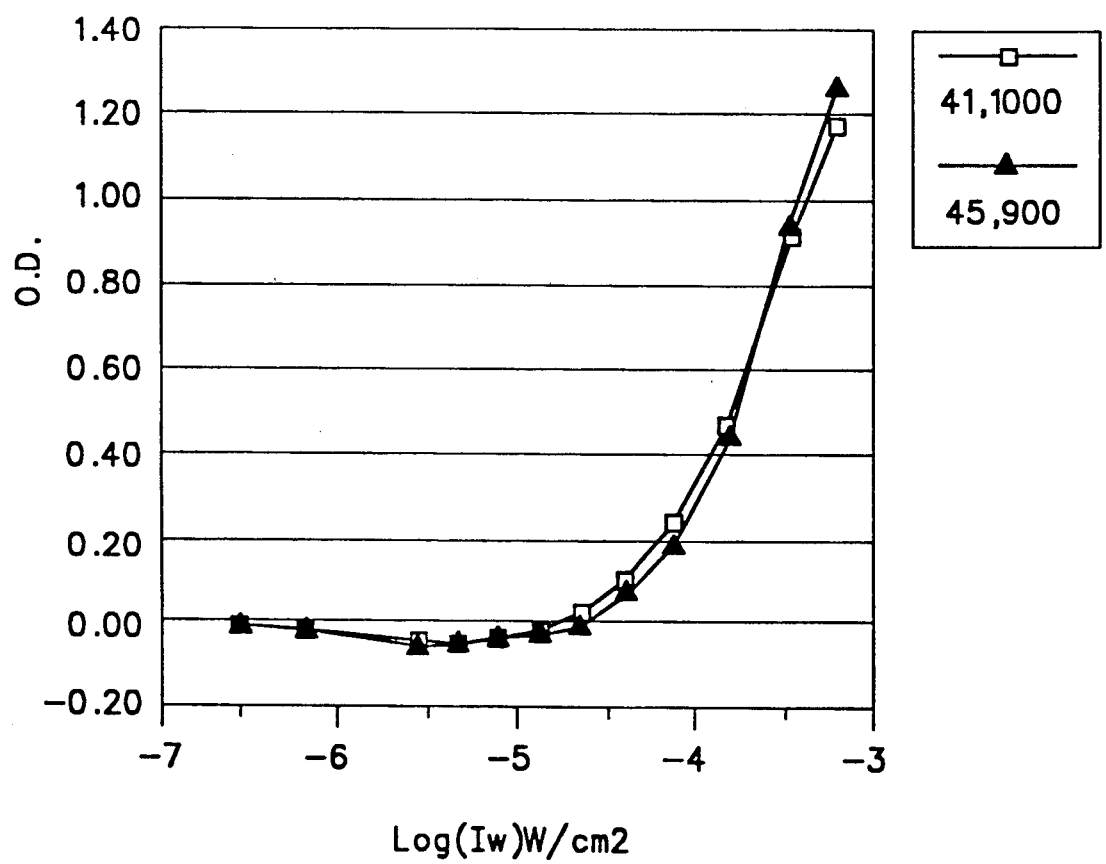
FIGS. 4A and 4B are illustrative graphs of the $\log_{10}$ of the intensity of reflected light from the liquid crystal cell as a function of the $\log_{10}$ of the intensity of write light on the photoconductor.
Figure 4B:
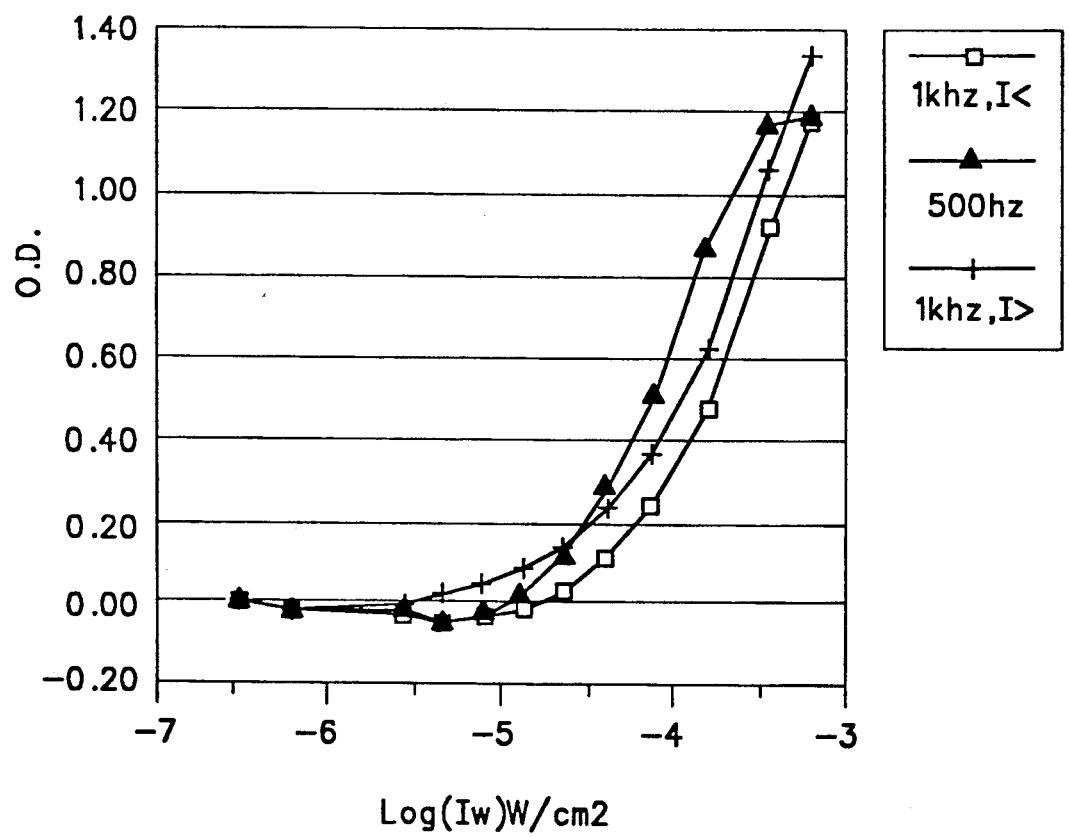

Referring to FIG. 4A and FIG. 4B, graphs of the optical density of the liquid crystal as a function of intensity of the incident write light are shown for various cell temperatures, addressing pulse voltages, and addressing pulse frequencies. An optical density of 0 corresponds to a darkened scattering texture. (Optical density is here defined as the $\log_{10}$ of the reflected light intensity.) Other operational variables that may effect the optical density include delay between the beginning of the addressing pulse and the optical pulse, the duration of the addressing pulse and the duration of the optical pulse.

The device can be addressed serially. An example of serial addressing is a laser addressed system, in which one pixel is illuminated at a time. In the case of a laser addressed device, both the intensity and speed of the scanning beam affect the degree of field induced reorientation and the resolution of written features. The serial addressing is most useful for the writing of electronic data. Serial laser addressing is particularly amenable to digital data. In the case of serial laser addressing the intermediate levels of illumination, greyscale may also be achieved with pulse width modulation of the write laser beam. Diode lasers are better suited to this mode of operation than analog modulation.

The device can also be addressed in parallel. An example of parallel addressing is a use of a real time image focused on the device such that all of the pixels are illuminated at once. In the case of a parallel addressed device both the intensity and duration of the write light affect the induced field. Parallel addressing is amenable to data in an analog form, such as a projection slide. Parallel addressing is most useful for image capture.

Figure 5:
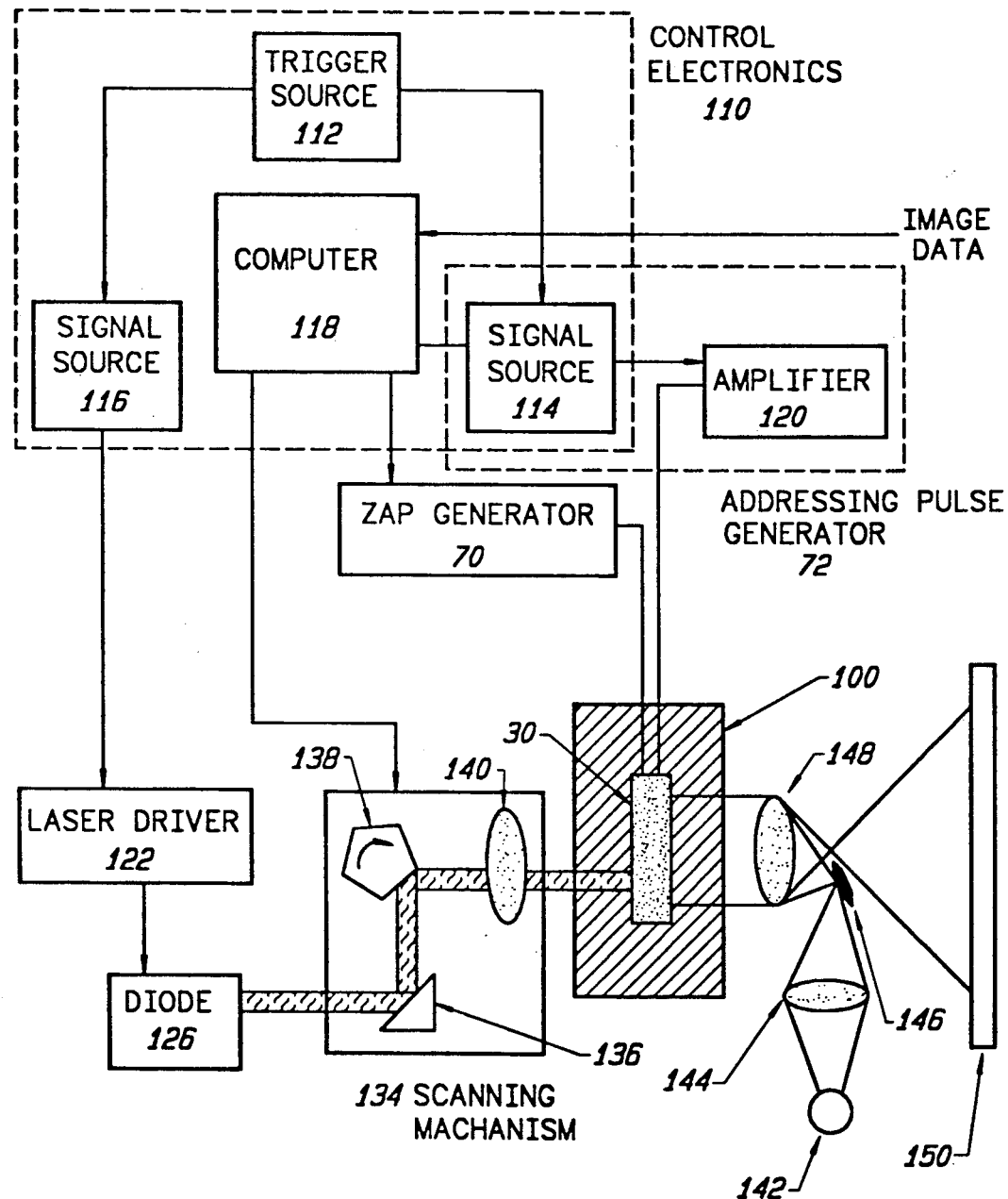
FIG. 5 is a schematic diagram of an apparatus designed for the serially addressing of the liquid crystal cell.

Referring to FIG. 5, a schematic is shown of a constructed apparatus devised for the serial addressing of the liquid crystal cell. The cell 30 is placed in a cell oven 100 that provides temperature control. Control electronics 110 control the application of the zap pulse, addressing pulse, the pulse width modulation of the laser beam, and the laser beam positioning mechanism. Control electronics 110 consists of a trigger source 12, signal sources 114 and 116, and computer 118. Image data enters computer 118 where it can be processed and manipulated by various error reduction techniques. Trigger source 12, such as a HeNe laser electronics and detector, in conjunction with computer 118, sends a trigger signal to signal sources 114 and 116. Signal source 114 in conjunction with amplifier 10 act as addressing pulse generator 72. Signal source 114, such as the Wavetek-75 which was sued in the constructed device, sends a signal to an amplifier 70 which sends an addressing pulse to the cell. Signal source 116, a Wavetek-178 for example, sends a signal to the laser drive 122, which activates laser diode 126. Computer 118 also sends signals to scanning electronics 132 which control the scanning mechanism 134. In the constructed scanning mechanism 134, the laser beam produced by laser diode 126 is reflected off a galvanometer 136 and a rotating polygon 138, and through scanning lens 140 onto cell 30. A reflective octagon rotating at 1800 rmp was successfully used for rotating polygon 138. The galvanometer and rotating polygon, for example, control the deflection of a laser beam, and thereby control the point where the laser impinges on the cell 30. Rotating polygon 138 provides an automatic method of line scanning a laser across the cell surface at consistent speeds. Computer 118 sends appropriate signals to zap generator 72 which applies the zap pulse to the cell 30. After the cell 30 has been written upon, light energy source 142 is activated. Light travels from light energy source 142, through optical condenser 144, is reflected from mirror 146, and strikes liquid crystal cell 30. With proper projection optics 148, the light reflected from clear regions of the liquid crystal cell 30 is transferred onto the image surface 150, which can be a projection screen, photosensitive medium, or other light receiving surface.

Once switched from scattering to clear, a pixel cannot be changed until blanked again by a Zap pulse. However, there can be repeated applications of the bias voltage in conjunction with the optic image. Therefore it would be possible to address different sections of the liquid crystal cell during each writing period, or to overlay a lighter image over a dark image. An alternate possibility is to construct a cell with multiple transparent electrodes 40 which can be zapped independently, allowing separate sections of the cell to be blanked and darkened independently.

Another embodiment of this invention includes a light blocking layer in liquid crystal cell 30. This type of cell can be written upon at the same time that it is read because the small amount of light transmitted through dielectric mirror 50 which would activate photoconductor 46, and thereby degrade el performance, is blocked. Simultaneous read and write are not necessary in many applications of this invention, because the image is non-volatile and is not updated at the flicker frequency of the human eye. However, for applications in which simultaneous reading and writing of the cell 30 are necessary, a light blocking layer must be included. This invention has most useful application for image capture for optical signal processing, electronic photography, document reproduction and printing, and electronic slide projection.

The foregoing description of a specific embodiment of the present invention has been presented for purposes of illustration and description. It is not intended to be exhaustive or to limit the invention to the precise forms disclosed, and obviously many modifications and variations are possible in light of the above teaching. The embodiments were chosen and described in order to best explain the principles of the invention and its practical application. Specifically, although FIG. 5 shows a serial laser addressed device, the claims are meant to extend to any photoaddressed method, including parallel addressing, line addressing, and other forms of photoaddressing by cathode ray tubes, matrix modulators, electroluminescent panels, and other light sources. It is intended that the scope of the invention be defined by the claims appended hereto and their equivalents.

We claim:

1. A liquid crystal light valve apparatus comprising:
    a layer of liquid crystal for storing image information, said liquid crystal being of the type which can have scattering centers;
    means for creating an initial optical density in said liquid crystal by forming scattering centers, said creating means including
    means for applying a thermal pulse to said liquid crystal layer to raise the temperature thereof through the nematic-isotropic transition, and
    means for cooling said liquid crystal layer through the nematic-isotropic transition to produce scattering centers in said liquid crystal layer;
    photoconductor means aligned with said liquid crystal and positioned in close proximity thereto, said photoconductor varying an electric field applied across said liquid crystal in proportion to the amount of light impinging the photoconductor;
    means for applying an electric field across said liquid crystal and photoconductor when said liquid crystal layer has scattering centers; and
    means for impinging optical image information on said photoconductor, simultaneous to said application of said electric field across said liquid crystal and photoconductor, said photoconductor and applied field combining to produce a modified electric field across said liquid crystal which clears scattering centers in proportion to the image information so that said image information is impressed in said liquid crystal.

2. The apparatus of claim 1 wherein said means for impinging optical image information comprises means for optically addressing a light source in parallel.

3. The apparatus of claim 1 wherein said means for impinging optical image information comprises means for optically addressing a light source in series.

4. The apparatus of claim 1 wherein said liquid crystal is smectic A liquid crystal.

5. The apparatus of claim 1 wherein said liquid crystal includes a scattered background which blocks light before said impinging means impinges optical image information of said photoconductor.

6. The apparatus of claim 5 wherein said modified electric field comprises an electric field having values at least as great as a certain threshold value required to partially erase said scattering background which blocks light to a clear background, said certain threshold value occurring across said liquid crystal where optical energy from said optical image information has been impinged on a corresponding location on said photoconductor.

7. A liquid crystal light valve apparatus, comprising:
    a layer of liquid crystal for storing image information, said liquid crystal being of the sort which can have scattering centers;
    means for creating an initial optical density in said liquid crystal by forming scattering centers, said creating means including
    means for applying a thermal pulse to said liquid crystal layer to raise the temperature thereof through the nematic-isotropic transition, and
    means for cooling said liquid crystal layer through the nematic-isotropic transition to produce scattering centers in said liquid crystal layer, said creating means forming a background which blocks light by forming scattering centers in said layer of liquid crystal material;
    photoconductor means aligned with said liquid crystal and positioned in close proximity thereto, said photoconductor spatially varying a magnitude of an electric field applied across said liquid crystal in proportion to the amount of light impinging the photoconductor;
    means for applying a uniform electric field across said liquid crystal and photoconductor when said liquid crystal has scattering enters; and
    means for impinging spatially varying optical image information on said photoconductor, simultaneous to said application of said uniform electric field, said photoconductor and said applied field combining to apply a spatially varying electric field across said liquid crystal to change said scattering background to a spatially varying clear background where said electric field has increased above a threshold value to impress said image information in said liquid crystal.

8. The apparatus of claim 7 wherein said liquid crystal material is smectic A liquid crystal.

9. A method of operating a liquid crystal light valve, comprising the steps of:
    providing a layer of liquid crystal for storing image information, said liquid crystal being of the sort which can have scattering centers;
    creating an initial optical density in said liquid crystal by forming scattering centers, said creating step including
    applying a thermal pulse to said liquid crystal layer to raise the temperature thereof through the nematic-isotropic transition, and cooling said liquid crystal layer through the nematic-isotropic transition to produce scattering centers in said liquid crystal layer;

aligning a photoconductor with said liquid crystal and positioning said photoconductor in close proximity thereto, said photoconductor varying an electric yield applied across said liquid crystal in proportion to the amount of light impinging the photoconductor;

applying an electric field across said liquid crystal and photoconductor when said liquid crystal has scattering centers; and impinging optical image information on said photoconductor, simultaneous to applying said electric field across said liquid crystal and photoconductor, said photoconductor and applied field combining to produce a modified electric yield across said liquid crystal which clears scattering centers in proportion to the image information so that said image information is impressed in said liquid crystal.

10. A method of producing a spatially varying optical density in a liquid crystal light valve apparatus which includes a liquid crystal layer of the sort which can have scattering centers, said method comprising the steps of:

creating an initial optical density in said liquid crystal light valve by forming scattering enters in said liquid crystal layer, said creating step including applying a thermal pulse to the liquid crystal layer to raise the temperature thereof through the nematic-isotropic transition, and cooling the liquid crystal layer through the nematic-isotropic transition to produce scattering centers in the liquid crystal layer; and applying a spatially varying electric field to said liquid crystal layer in away which clears the scattering centers in proportion to the spatial variation of said electric field, to produce a corresponding spatially varying optical density.

11. The method of claim 10 wherein the initial optical density is spatially uniform.

12. The method of claim 10 wherein the step of applying a spatially varying electric field includes the steps of applying a spatially uniform electric field across the liquid crystal layer and a photoconductor layer positioned in close proximity to the liquid crystal layer, and simultaneously applying spatially varying optical image information to the photoconductor layer to spatially alter its impedance to produce a spatially varying field across said liquid crystal layer.

13. The method of claim 10 wherein said liquid crystal material is Smectic A.

14. The method of a claim 13 wherein the step of applying a spatially varying electric field occurs when the liquid crystal layer is in the smectic state.

15. The method of claim 10 wherein the spatially varying electric field creates an optical density which ranges from scattering to completely clear and includes intermediate values.

16. A liquid crystal light valve apparatus, comprising:

a layer of liquid crystal for storing image information, said liquid crystal being of the sort which can have scattering center;

means for creating a uniform optical density in said liquid crystal light valve by forming scattering centers in said layer of liquid crystal material, said creating means including means for applying a thermal pulse to the liquid crystal layer to raise the temperature thereof through the nematic-isotropic transition, and means for cooling the liquid crystal layer through the nematic-isotropic transition to produce scattering centers in the liquid crystal layer;

photoconductor means aligned with said layer of liquid crystal and positioned in close proximity thereto for spatially modulating a magnitude of an electric field applied across said layer of liquid crystal in proportion to the amount of light impinging the photoconductor;

means for applying a uniform electric field across said layer of liquid crystal and photoconductor when said liquid crystal is provided with scattering centers; and means for impinging optical image information which spatially varies in illumination intensity onto said photoconductor, simultaneous to said application of said uniform electric field, said photoconductor and said applied field combining to apply an electric field which spatially varies in magnitude across said liquid crystal to change said uniform optical density to a spatially varying optical density which can vary in degree of optical density from scattering to completely clear, including intermediate values, in proportion to the image information, by clearing scattering centers in said liquid crystal layer.

* * * * *